United States Patent
Knittel

(10) Patent No.: US 11,048,944 B2
(45) Date of Patent: Jun. 29, 2021

(54) SPATIO-TEMPORAL FEATURES FOR VIDEO ANALYSIS

(71) Applicant: CANON KABUSHIKI KAISHA, Tokyo (JP)

(72) Inventor: Anthony Knittel, Maroubra (AU)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 16/211,005

(22) Filed: Dec. 5, 2018

(65) Prior Publication Data

US 2019/0188482 A1 Jun. 20, 2019

(30) Foreign Application Priority Data

Dec. 14, 2017 (AU) .............................. 2017276279

(51) Int. Cl.
| | |
|---|---|
| *G06K 9/00* | (2006.01) |
| *H04N 5/232* | (2006.01) |
| *H04N 21/44* | (2011.01) |
| *G06T 7/246* | (2017.01) |
| *H04N 21/234* | (2011.01) |

(52) U.S. Cl.
CPC ..... *G06K 9/00744* (2013.01); *G06K 9/00758* (2013.01); *G06T 7/246* (2017.01); *H04N 5/23264* (2013.01); *H04N 5/23267* (2013.01); *H04N 21/23418* (2013.01); *H04N 21/44008* (2013.01)

(58) Field of Classification Search
CPC ............ G06K 9/00744; G06K 9/00758; G06T 2/246; H04N 5/23264; H04N 5/23267; H04N 21/44008
See application file for complete search history.

(56) References Cited

U.S. PATENT DOCUMENTS

| | | | | |
|---|---|---|---|---|
| 10,037,477 | B2* | 7/2018 | Cha | ................... G06K 9/00664 |
| 2011/0304541 | A1* | 12/2011 | Dalal | ...................... G06F 3/017 |
| | | | | 345/158 |
| 2011/0311137 | A1* | 12/2011 | Liu | ...................... G06K 9/4642 |
| | | | | 382/173 |
| 2018/0053057 | A1* | 2/2018 | De Souza | ............ G06K 9/6259 |

OTHER PUBLICATIONS

Basura Fernando, et al., "Discriminative hierarchical rank pooling for activity recognition", In Proceedings of the IEEE Conference on Computer Vision and Pattern Recognition 2016, pp. 1924-1932.

(Continued)

*Primary Examiner* — Zhitong Chen

(74) *Attorney, Agent, or Firm* — Canon U.S.A., Inc. IP Division

(57) ABSTRACT

A method of determining a spatio-temporal feature value for frames of a sequence of video. A first frame and second frame from the sequence of video are received. Spatial feature values in each of the first and second frames are determined according to a plurality of spatial feature functions. For each of the spatial feature functions, a change in the spatial feature values between the first and second frames is determined. The spatio-temporal feature value is determined by combining the determined change in spatial feature values for each of the spatial feature functions.

13 Claims, 10 Drawing Sheets

(56) References Cited

OTHER PUBLICATIONS

Karen Simonyan, et al., "Two-stream convolutional networks for action recognition in videos", In Advances in Neural Information Processing Systems 27, Proceedings from Neural Information Processing Systems, Montreal, Canada, Dec. 2014, pp. 568-576.

Du Tran, et al., "Learning spatiotemporal features with 3d convolutional networks", In 2015 IEEE International Conference on Computer Vision (ICCV), IEEE: 2015, pp. 4489-4497.

Eero P. Simoncelli, et al., "A model of neuronal responses in visual area MT", revised May 26, 1997, Published in Vision Research in 1998, vol. 38, No. 5, pp. 743-761.

* cited by examiner

SPATIO-TEMPORAL FEATURES FOR VIDEO ANALYSIS

REFERENCE TO RELATED PATENT APPLICATION

This application claims the benefit under 35 U.S.C. § 119 of the filing date of Australian Patent Application No. 2017276279, filed Dec. 14, 2017, hereby incorporated by reference in its entirety as if fully set forth herein.

TECHNICAL FIELD

The present invention relates to a method, system and apparatus for creating spatio-temporal features from video, suitable for use by an automated classifier, such as a support vector machine or an artificial neural network. The present invention further relates to a computer readable medium storing instructions executable to implement a method for creating spatio-temporal features from video, suitable for use by an automated classifier. The automated classifier may use the features during a training phase, and during a recall phase.

BACKGROUND

The use of digital video cameras to observe daily activities is becoming more widespread. Such observations may be streamed for immediate use, may be recorded for future use, or may be analysed in order to obtain metadata. For example, video from a surveillance camera may be streamed online to enable commuters to check traffic conditions in real time, or may be recorded in order to allow later identification of the perpetrators of an illegal act, or may be analysed in order to count the number of shoppers in a store.

Some other examples of the analysis of videos in order to obtain metadata are the identification of: shoplifting activity in a store; blowing out birthday candles at a party; loitering behaviour in a carpark; or collapse of an elderly person in their home.

Another example of the analysis of videos in order to obtain metadata is the identification of plays in a sports game. For example, in the game of association football, or its indoor counterpart futsal, such plays may include a player dribbling the ball, a player passing the ball to another player, or a player making a shot at goal. Such analysis of videos is useful in order to identify the most important moments to include in a highlights video presentation, or to assist coaches who wish to analyse the performance of players in their own team or opposition teams, or to gather statistics for the use by coaches or for presentation to television viewers for entertainment purposes.

Human analysis of videos in order to obtain such metadata is labor intensive, tedious, and thus expensive.

Thus, there is a need for automated analysis of videos, in order to identify objects and actions present in videos, with little or no intervention by a person.

SUMMARY

It is an object of the present invention to substantially overcome, or at least ameliorate, one or more disadvantages of existing arrangements.

Disclosed is an arrangement which applies C multiple spatial feature functions to two frames. The feature functions are applied densely. After compensating for background motion, the corresponding feature values between the two frames are compared. Temporal gradient feature functions are applied to the spatial feature values between the two frames. Applying the temporal gradient feature functions to the spatial feature values produces two temporal gradient response values based on the sign of the change. The two temporal gradient response values include a vanishing response ("a") and an emergence response ("b"). The vanishing response corresponds to the decrease of spatial feature values over the time period between the two frames. The emergence response corresponds to the increase of spatial feature values over the time period between the two frames.

V different "velocities" may be considered, each with a direction (D) and speed (S). For each different speed S, blurred responses a' and b' may be determined, blurred according to the speed.

For each of V different "velocities", offsets dx and dy may be determined, based on direction (D), speed (S), and the time difference between the two frames.

For each of V different velocities, and C different feature functions, a motion response (m) is determined densely. The motion response (m) may be determined according to a formula m=sqrt(a'*b"), where a' is the blurred vanishing response at the location, and b" is the blurred emergence response at the location displaced by dx and dy. The motion response (m) represents a strong vanishing response between the two frames at one location, and a corresponding emergence response between the two frames at the "displaced" location, giving evidence that an object (which produced the "emergence" spatial feature values corresponding to one or more spatial feature functions) has moved in that direction.

The responses from the C different spatial feature functions may be combined by averaging, for a given location and V velocity.

According to one aspect of the present disclosure, there is provided a method of determining a spatio-temporal feature value for frames of a sequence of video, the method comprising:

receiving a first frame and second frame from the sequence of video;

determining spatial feature values in each of the first and second frames according to a plurality of spatial feature functions;

determining, for each of the spatial feature functions, a change in the spatial feature values between the first and second frames; and determining the spatio-temporal feature value by combining the determined change in spatial feature values for each of the spatial feature functions.

According to another aspect of the present disclosure, there is provided an apparatus for determining a spatio-temporal feature value for frames of a sequence of video, the apparatus comprising:

means for receiving a first frame and second frame from the sequence of video;

means for determining spatial feature values in each of the first and second frames according to a plurality of spatial feature functions;

means for determining, for each of the spatial feature functions, a change in the spatial feature values between the first and second frames; and means for determining the spatio-temporal feature value by combining the determined change in spatial feature values for each of the spatial feature functions.

According to still another aspect of the present disclosure, there is provided a system for determining a spatio-temporal feature value for frames of a sequence of video, the system comprising:
    a memory for storing data and a computer program;
    a processor coupled to the memory for executing the computer program, the program having instructions for:
        receiving a first frame and second frame from the sequence of video;
        determining spatial feature values in each of the first and second frames according to a plurality of spatial feature functions;
        determining, for each of the spatial feature functions, a change in the spatial feature values between the first and second frames; and
        determining the spatio-temporal feature value by combining the determined change in spatial feature values for each of the spatial feature functions.

According to still another aspect of the present disclosure, there is provided a non-transitory computer readable medium having a computer program for determining a spatio-temporal feature value for frames of a sequence of video, the program comprising:
    code for receiving a first frame and second frame from the sequence of video;
    code for determining spatial feature values in each of the first and second frames according to a plurality of spatial feature functions;
    code for determining, for each of the spatial feature functions, a change in the spatial feature values between the first and second frames; and
    code for determining the spatio-temporal feature value by combining the determined change in spatial feature values for each of the spatial feature functions.

Other aspects are also disclosed.

BRIEF DESCRIPTION OF THE DRAWINGS

Some aspects of the prior art and one or more embodiments of the invention will now be described with reference to the following drawings, in which.

DETAILED DESCRIPTION INCLUDING BEST MODE

Figure 1A:
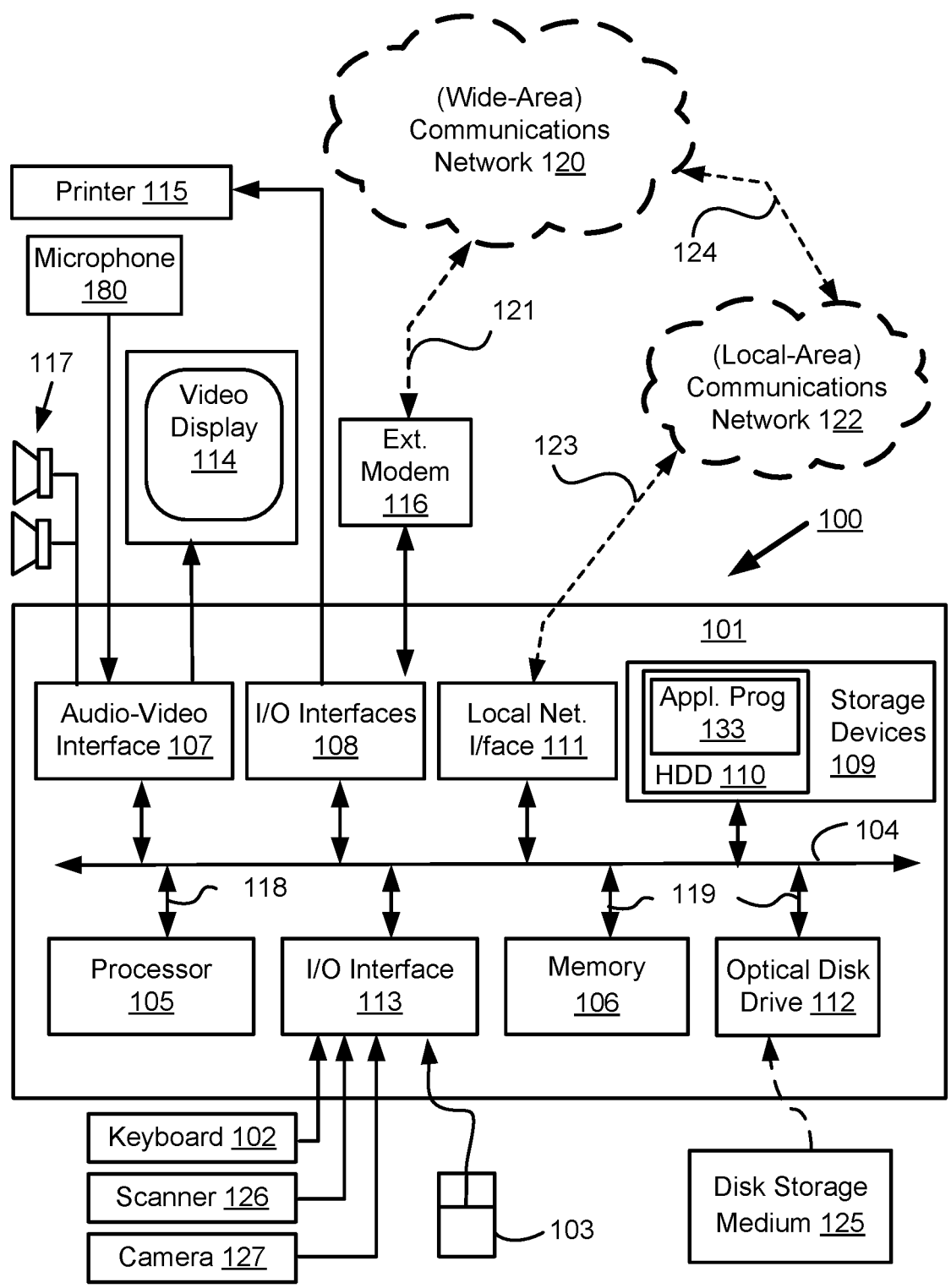
FIGS. 1A and 1B form a schematic block diagram of a general purpose computer on which described arrangements may be practised.

A feature value of a video is an individual measurable property of the video. A feature function is a method of determining a feature value at one or more locations of one or more frames of the video. A plurality of feature functions may be evaluated at a plurality of locations of a plurality of frames of a video, in order to create a collection of feature values for the video. The collection of feature values may be combined into a feature vector. A spatial feature value is a feature value that is determined from the spatial proximity of one location of one frame of a video. A spatial feature function is a feature function used to determine a spatial feature value.

A spatio-temporal feature value is a feature value that is determined from the spatial proximity of one location of the temporal proximity of one frame of a video. A spatio-temporal feature function is a feature function used to determine a spatio-temporal feature value. A temporal gradient feature function is a spatio-temporal feature function, that determines a temporal gradient feature value from the spatial proximity of one location of a pair of frames of a video.

One method of automatically analysing videos in order to obtain metadata is to use a computer program. One advantage of the use of such a program is reduced cost, because the amount of human effort required is reduced. Another advantage of the use of such a program is reduced delay, because the execution time of the computer program may be reduced by the utilisation of a sufficiently powerful computer system. A common method of developing such a program is to use machine learning. Machine learning is a method where sample data is used to determine parameters of a model in a training phase, and the parameterized model is then used to make predictions for subsequent data in a recall phase.

In the case of videos, the sample data consists of feature vectors determined from videos, and associated metadata labels. The video may be divided into temporal segments of uniform length (e.g., twenty five (25) frames), and feature vectors are determined for each temporal segment. The feature vectors and metadata are used to determine the parameters of a model, using machine learning.

In order to automatically analyse a video in order to obtain metadata, the video may be divided into temporal segments of uniform length. Feature vectors are determined from each temporal segment. The feature vectors are supplied as inputs to the parameterized model, and the metadata are obtained as outputs from the model. The parameterized model is a classifier, that takes feature vectors as inputs, and outputs object classifications (e.g., "no object", "ball", "candle", "bed") or action classifications (e.g., "no action", "kick", "run", "collapse").

The feature function that is used to determine the feature vectors is an important factor that determines whether outputs of the classifier are accurate. Some common feature functions, used for the automated analysis of videos, are now described.

One spatial feature function is the use of a raw pixel value that corresponds to the response of one color channel at one location of one frame in the video. Another spatial feature function is the determination of a color channel gradient that represents the spatial variation of raw pixel values in the spatial proximity of one location of one frame in the video. Still another spatial feature function is the determination of a histogram of orientated gradients that represents the distribution of color channel gradients in the spatial proximity of one location of one frame in the video. Still another spatial feature function is a two-dimensional Gabor filter with a pre-determined orientation and scale that represents the absence or presence of a spatial gradient in the spatial proximity of one location of one frame in the video. Still another spatial feature function is a one-dimensional symmetric sinusoidal filter with a pre-determined orientation and scale that represents the absence or presence of a spatial gradient in the spatial proximity of one location of one frame in the video.

Spatio-temporal feature functions are advantageous compared to spatial feature functions for the identification of objects and actions in video, because spatio-temporal feature values represent variations in the appearance of objects that are useful for the identification of actions, and are not captured with spatial feature functions. The use of spatio-temporal feature functions improves the accuracy of the classifier.

One pair of spatio-temporal feature functions are the determination of horizontal and vertical optical flow values corresponding to orthogonal components of a vector that represents the dominant localized spatial translation between a previous frame and the current frame. Alternatively, the vector may represent the dominant localized spatial translation between the current frame and a subsequent frame, at one location of one frame in the video. Another spatio-temporal feature function is the determination of a histogram of optical flow that represents the distribution of optical flow values in the spatial and temporal proximity of one location of one frame in the video. Another spatio-temporal feature function is the determination of an optical flow gradient that represents the spatial variation of optical flow values at one location of one frame in the video. Still another spatio-temporal feature function is the determination of a motion boundary histogram that represents the distribution of optical flow gradients in the spatial proximity of one location of one frame in the video. Still another spatio-temporal feature function is the determination of a relative flow direction value that represents the difference in optical flow gradients determined between pairs of nearby points, positioned relative to each other according to a spatial displacement and a spatial direction, of one frame in the video. Still another spatio-temporal feature function is the determination of an internal motion histogram that represents the distribution of relative flow direction values in the spatial and temporal proximity of one location of one frame in the video.

The optical flow feature function, and feature functions determined from optical flow, have the limitation that optical flow is based on the dominant localized spatial translation between two frames. If the appearance of the object is such that the localized spatial translation is ambiguous, then the optical flow feature values may not accurately represent the motion of the object. The classifier using optical flow feature values, or feature values determined from optical flow, is less accurate when an optical flow feature value does not represent the motion of the object.

The accuracy of the classifier may be improved by a spatio-temporal feature function that allows the motion of an object to be correctly represented even when the localized spatial translation of the object is ambiguous, based on the appearance of the object.

A spatio-temporal feature function that determines a multi-valued response that is able to identify multiple possibilities for the motion of an object, when the spatial translation of the object is ambiguous, is described below.

Figure 2:
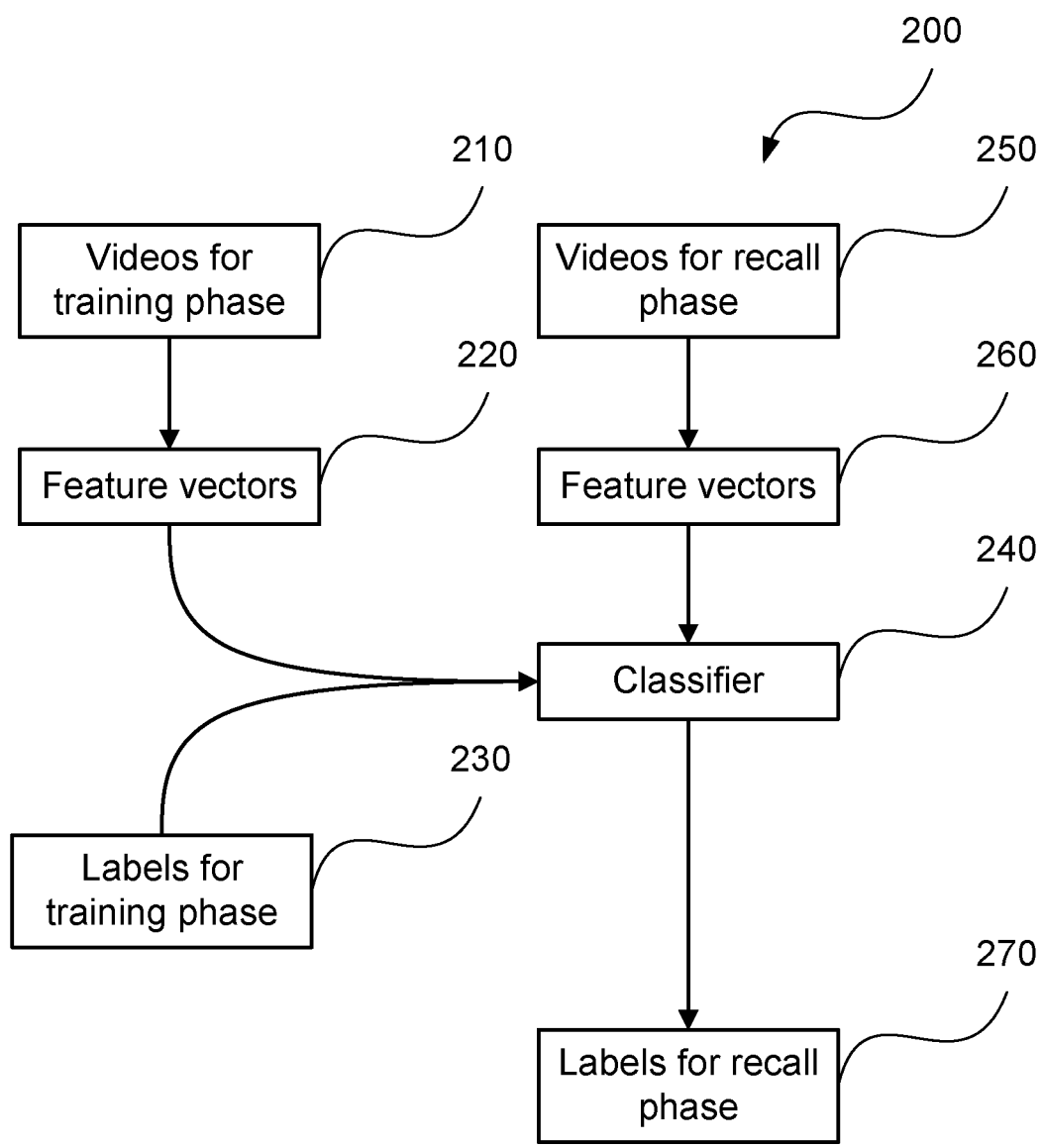
FIG. 2 shows training and recall phases for a classifier.

FIG. 2 shows training and recall phases for a classifier 240. In both phases, a video is used to generate feature vectors that are used as input to the classifier 240. Once trained, the classifier 240 uses the feature vectors to generate labels in the recall phase where the labels are for objects or actions in a scene captured in the video. The labels generated by the classifier 240 may be used for later processing to select temporal segments of the video that contain objects or actions of interest.

In a training phase, the parameters of the classifier 240 are configured in order to identify objects and actions of interest in a video. A collection of feature vectors 220, corresponding to a collection of videos 210, and a corresponding collection of labels 230 that identify objects and actions of interest, are used as inputs to the classifier 240 in order to configure the parameters of the classifier.

The classifier 240 may use machine learning to determine the parameters of a model.

In a subsequent recall phase, a collection of feature vectors 260, corresponding to a collection of videos 250, is used as an input to the classifier 240. The classifier 240, whose parameters are configured during the previous training phase, identifies objects and actions of interest, and emits corresponding labels 270.

Arrangements described below may be used to determine the feature vectors 220 and 260.

A method 300 of determining a feature vector corresponding to a pair of frames in a video, is described below with reference to FIG. 3. A method 400 of determining spatio-temporal feature values, will also be described below with reference to FIG. 4. A plurality of spatio-temporal features are determined by combining vanishing responses with corresponding emergence responses. The emergence responses are spatially displaced according to a plurality of directions and speeds, such that both the vanishing responses and the emergence responses contribute to the determination of the spatio-temporal features.

The plurality of spatio-temporal features allows the motion of an object to be correctly represented even when the localized spatial translation of the object is ambiguous, based on the appearance of the object.

Figure 1B:
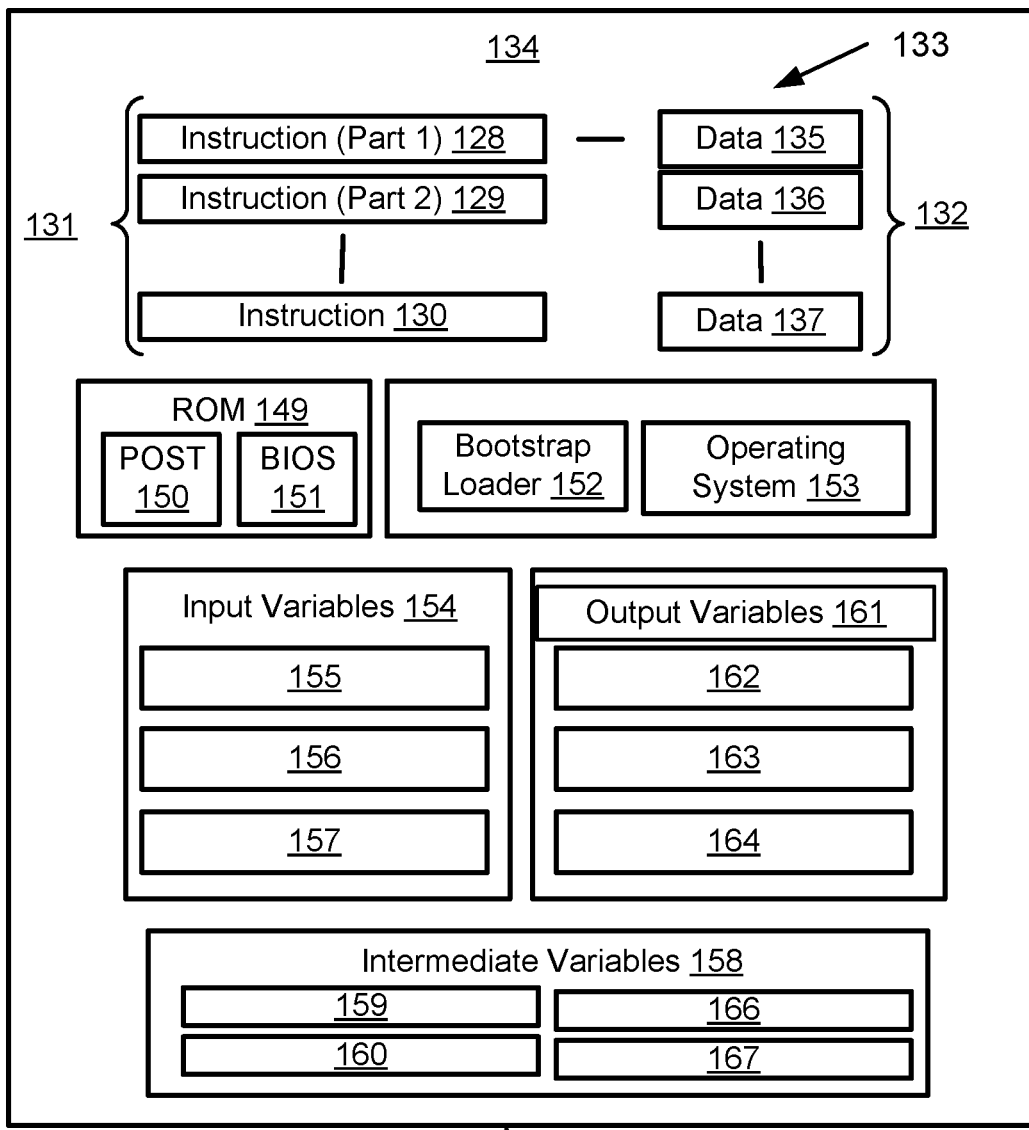
Figure 1B:
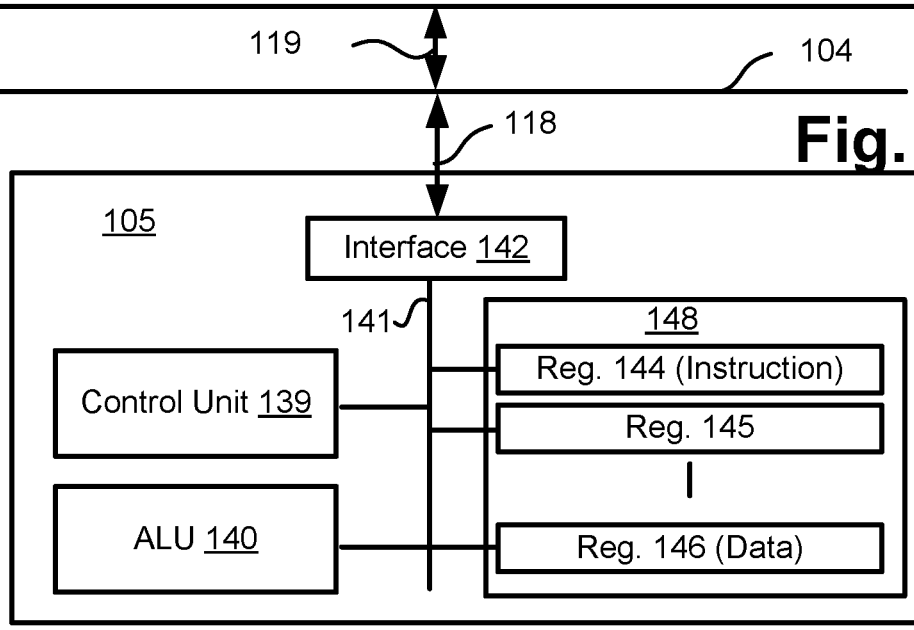

FIGS. 1A and 1B depict a general-purpose computer system 100, upon which the method 200 and other methods described below can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

Figure 3:
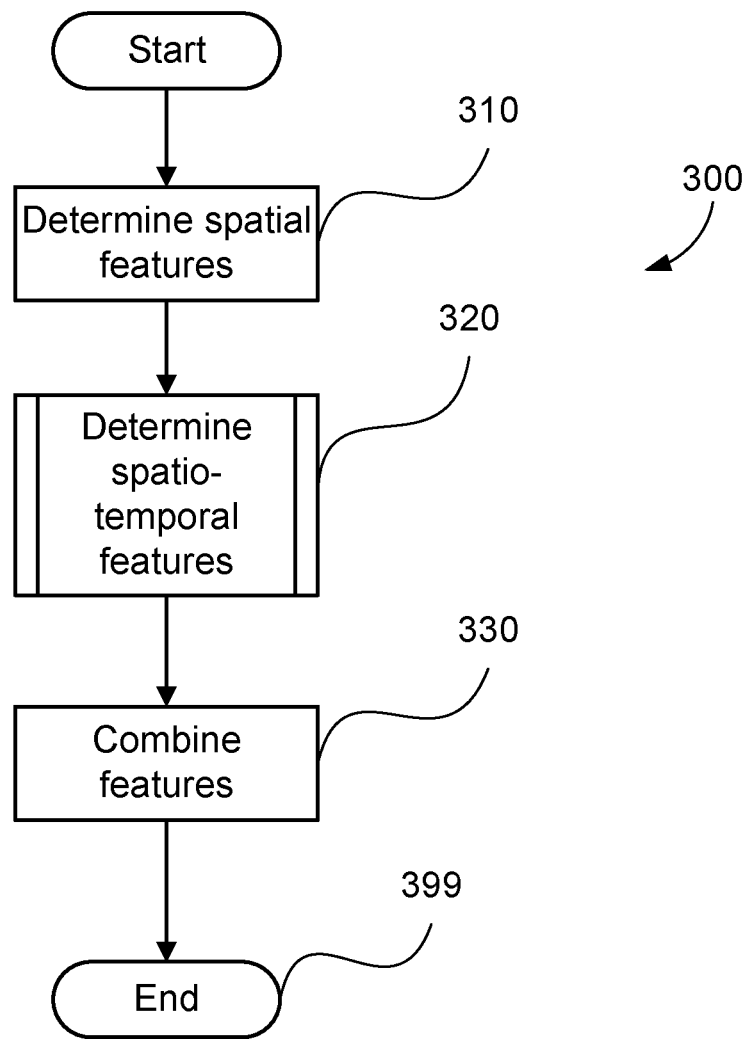
FIG. 3 is a schematic flow diagram showing a method of determining a feature vector.
Figure 4:
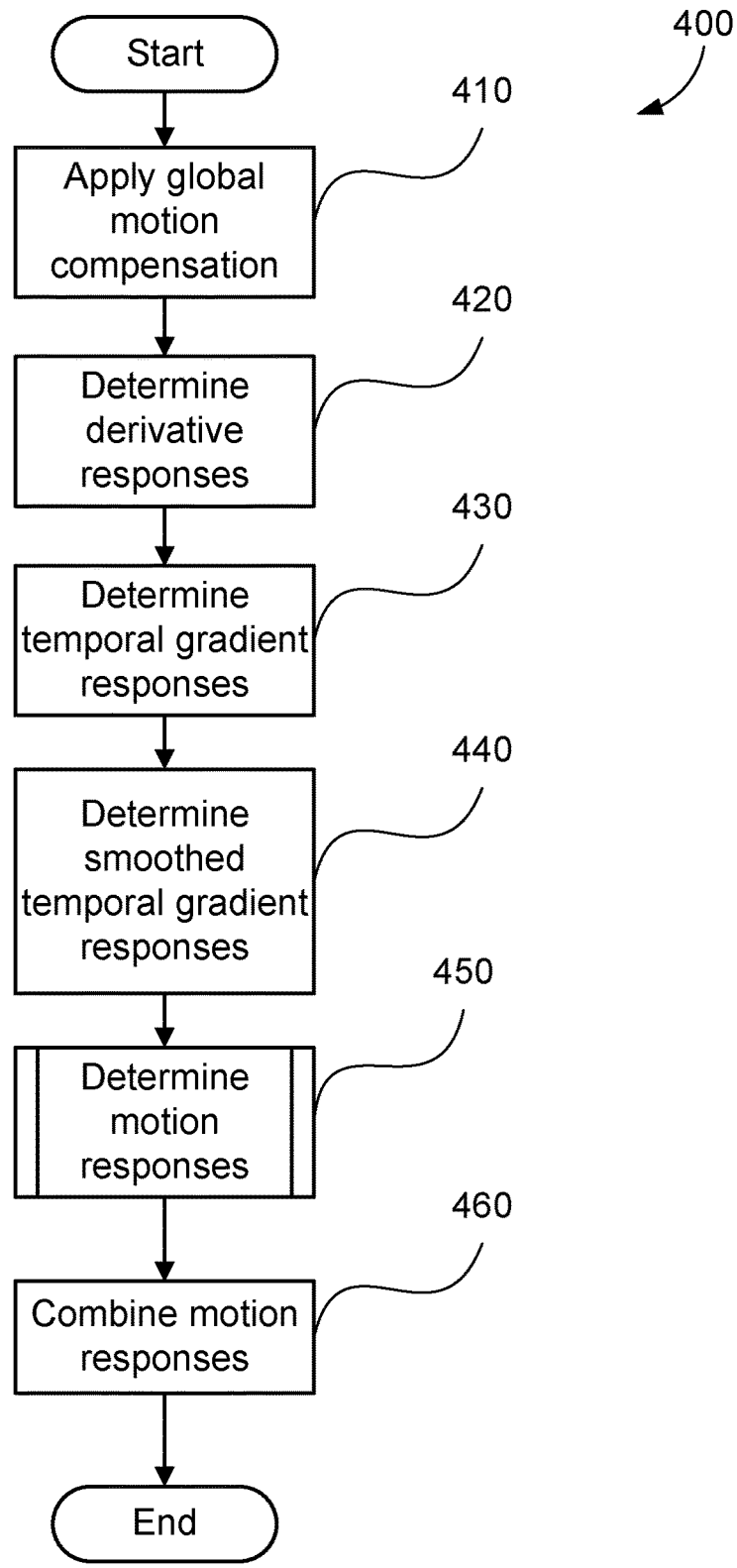
FIG. 4 is a schematic flow diagram showing a method of determining spatio-temporal feature values as used in the method of FIG. 3.
Figure 5:
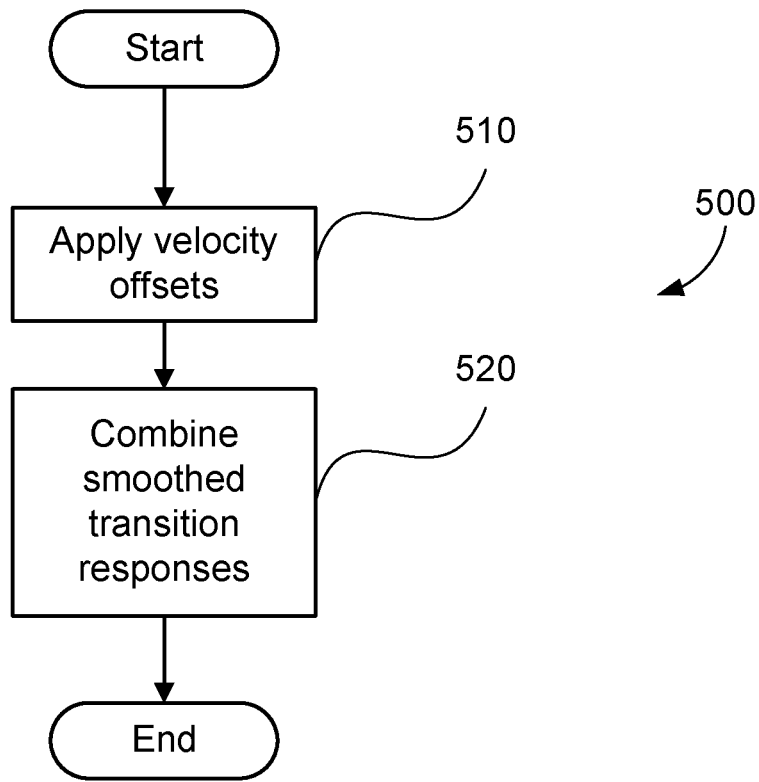
FIG. 5 is a schematic flow diagram showing a method of determining motion response values as used in the method of FIG. 4.

The method 200 and the other described methods may be implemented using the computer system 100 wherein the processes of FIGS. 3, 4 and 5, to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfill various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3, 4 and 5 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the methods. Such dedicated hardware may include graphic processors, digital signal processors, or one or more microprocessors and associated memories.

The method 300 takes two frames in a video as input, and determines a feature vector as output. Feature vectors are used to represent the video in the training and recall phases of a classifier. The classifier is used to generate labels for objects or actions of interest in the video. The ability of the feature vectors to represent information in the video is a factor that determines the accuracy of the classifier, since it is advantageous for the classifier to be given feature vectors that are simultaneously compact, and informative about the possible of motion of objects.

The method 300 starts at determining step 310, where spatial feature values for two frames in the video are determined under execution of the processor 105. The spatial feature values determined at step 310 may be stored in the memory 106. The spatial feature values are used to characterise spatial regions of the frame, according to visual appearance of the spatial regions. For example, spatial feature values may be informative with regard to color, texture, presence or absence of corners or edges in a spatial region of a frame. In a spatial region of a frame, a high spatial feature value may indicate the presence of a distinctive visual appearance, whereas a low spatial feature value may indicate a lack or absence of a distinctive visual appearance.

In spatial regions of two frames in a video, located at the same spatial location, an increase in a spatial feature value from a first frame to a subsequent second frame may indicate the emergence of an object with a distinctive visual appearance at that spatial location. A decrease in spatial feature value may indicate the vanishing of an object.

The characterisation of a spatial region in a first frame, by the use of spatial features, enables the determination that a spatial region in a second frame, possibly spatially displaced from the location in the first frame, has a visual appearance that is similar. The determination of similarity allows for the expected variations between the frames such as sensor noise, and minor changes in position or lighting.

The spatial feature functions used to determine the spatial feature values may include, for example, a histogram of oriented gradients, a plurality of Gabor filters, or a plurality of one-dimensional symmetric sinusoidal filters. The spatial feature functions used to determine the spatial feature values may be informative with regard to color, texture, presence or absence of corners or edges in a spatial region of a frame. The spatial feature functions may include a plurality of orientations and scales. The spatial feature functions are informative with regard to the coarseness and orientation of textures, and the orientation of edges and corners.

The spatial feature functions are applied to each frame separately at step 310, in order to determine spatial feature values at a plurality of locations of each frame. The spatial feature functions may be applied to a frame using a grid of spatial locations spaced uniformly in the horizontal direction and spaced uniformly in the vertical direction.

The method 300 continues at determining step 320, where spatio-temporal feature values are determined, based on the spatial feature values determined at step 310. A method 400 of determining spatio-temporal feature values, as executed at step 320, will be described below with reference to FIG. 4.

The method 300 continues at combining step 330, where the spatial feature values determined at step 310 and the spatio-temporal feature values determined at step 320 are combined into a feature vector. The feature vector may be a one-dimensional vector of pre-determined length, being the representation of the visual appearance of two frames in the video that is used in the training or recall phase of a classifier. The length of the feature vector may be determined according to the characteristics of the classifier, and the characteristics of the training samples. If the feature vector is too short, the accuracy of the classifier is reduced. If the feature vector is too long, then the classifier may suffer from overfitting to the training samples, and the memory and processing requirements of the classifier are excessive.

The feature values are combined into a feature vector at step 330 by concatenation, such that the length of the feature vector is the number of feature values. However, in the case that the combination of the feature values results in a feature vector of excessive length, the number of feature values may be reduced by the use of dimensionality reduction. Methods of dimensionality reduction include the determination of a histogram, pooling, and reference to a dictionary of codewords. After dimensionality reduction, the feature values may be combined into a feature vector by a method such as concatenation, forming a feature vector of less than excessive length.

The method 400 of determining spatio-temporal feature values for two frames in the video, as executed at step 320, will now be described. The method 400 may be implemented as one or more software code modules of the software application program 133 resident on the hard disk drive 110 and being controlled in its execution by the processor 105.

Spatio-temporal feature values are used to characterise the apparent movement of objects, based on the visual appearance of the objects. For example, for a spatial region of a frame, spatial-temporal feature values may be informative with regard to the direction and magnitude of the apparent movement of that region in that frame to a different spatial region in a subsequent frame.

As input, the method 400 takes spatial feature values for a first frame, and spatial feature values for a second frame. The spatial feature values may be informative with regard to color, texture, presence or absence of corners or edges in a spatial region of a frame.

As output, the method 400 determines spatio-temporal feature values for the pair of frames. The spatio-temporal feature values are informative with regard to which spatial regions of the first frame correspond to objects that have moved between the first frame and the second frame. Furthermore, for each of the spatial regions, the method 400 outputs multiple values corresponding to a range of directions and displacements, where each value represents the likelihood that an object has moved in that direction with that displacement. The output of the method 400 is thus informative with regard to possibilities for the motion of objects between the first frame and the second frame, even when the visual appearances are such that there is ambiguity about the motions of the objects.

The method 400 starts at applying step 410, where global motion compensation is applied to the spatial feature values of the method 300 of FIG. 3. Movement of a camera (e.g., 127) between the first and second frames creates background motion in the video captured by the camera. Alternatively, or in addition to, if the video results from the use of clipped regions, the difference in location of the regions between the first frame and the second frame creates background motion in the video. In step 410, the spatial co-ordinates of the spatial feature values in the second frame are adjusted in order to align the backgrounds of the two frames. Aligning the background of the two frames allows perception of background motion as a result of a moving camera viewpoint to be inhibited.

The method 400 continues at determining step 420, where derivative response values are determined under execution of the processor 105. Each spatial feature value at each location in the first frame is compared with the corresponding spatial feature value at the corresponding location in the second frame, in order to determine the derivative response value.

The derivative response values are informative with regard to whether a spatial feature value has changed between the first frame and the second frame, after taking background motion into account. In the event that an object has moved from a first spatial region in the first frame to a second spatial region in the second frame, at the first spatial region there is a decrease in the spatial feature values that correspond to the visual appearance of the object, and at the second spatial region there is an increase in the spatial feature values. Correspondingly, at the first spatial region there are negative derivative response values, and at the second spatial region there are positive derivative response values.

A derivative response value is near zero when an object remains static in a spatial region, is negative when an object has vanished from a spatial region, and is positive when an object has emerged in a spatial region. In addition, the magnitude of the derivative response value is informative with respect to the likelihood that the change in the spatial feature value is not due to random noise, where a larger magnitude is associated with a greater likelihood.

The determination of a derivative response value may be by, for example, means of subtracting the spatial feature value of the first frame from the spatial feature value of the second frame.

The method 400 continues at determining step 430, where temporal gradient response values are determined under execution of the processor 105 and may be stored in the memory 106. For each derivative response value generated at the step 420, one emergence response value is determined, and one vanishing response value is determined at step 430.

The vanishing response value and the emergence response value are informative with regard to the change in the corresponding spatial feature value at a spatial location in a pair of frames of a video, after taking background motion into account. The vanishing response value corresponds to a reduction in the corresponding spatial feature value from the first frame to the second frame. The emergence response value corresponds to an increase in the corresponding spatial feature value from the first frame to the second frame.

The vanishing response value is determined by taking the absolute value of the minimum of the derivative response value determined in step 420 and zero, and is thus non-negative. The emergence response value is determined by taking the maximum of the derivative response value determined in step 420 and zero, and is thus non-negative. In Equations (1) and (2) below, v is the vanishing response, e is the emergence response, respectively, and d is the derivative response value:

$$v=|\min(d,0)| \quad (1)$$

$$e=\max(d,0) \quad (2)$$

The method 400 continues at determining step 440, where smoothed temporal gradient response values are determined under execution of the processor 105. The smoothed temporal gradient response values may be stored in the memory 106. The vanishing response values are smoothed by the application of a two-dimensional spatial filter, in order to determine smoothed vanishing response values. The emergence response values are smoothed similarly, in order to determine smoothed emergence response values.

Spatial feature values vary slightly from frame to frame even in the case of a static object, due to vibration of the camera, sensor noise in the camera, variation in lighting conditions, and small variations in the visual appearance of the object, such as due to wind. In the case that the object is a human, the visual appearance also varies due to movements such as breathing, talking, or minor swaying, causing small variations in the spatial feature values.

In addition, an object may span multiple spatial regions in a frame. Some spatial regions correspond to parts of the object that have a distinctive visual appearance (e.g., well-lit regions with a distinctive texture), that correspond to high spatial feature values. Other spatial regions correspond to parts of the same object that do not have a distinctive visual appearance (e.g., regions in deep shadow), that correspond to low spatial feature values. For this reason, the derivative response values, and the corresponding temporal gradient response values, may show variation over multiple spatial regions that correspond to a single object.

Smoothing the temporal gradient response values improves the reliability of the temporal gradient response values, considering random variations in visual appearance. Without smoothing, the temporal gradient response values are subject to spurious variations that lead to decreased classification accuracy. In order to smooth the temporal gradient response values, the spatial filter may be, for example, a convolution with a Gaussian kernel.

As another example, the spatial filter may have a spatial measure, related to the size of the kernel. In a case where the spatial filter may have a spatial measure, a plurality of smoothed temporal gradient response values may be determined, where each smoothed temporal gradient response value corresponds to a spatial measure that corresponds to a spatial measure of a velocity as at step 510 of method 500 shown in FIG. 5.

The method 400 continues at determining step 450, where motion response values are determined under execution of the processor 105, based on the smoothed temporal gradient response values determined at step 440. A method 500 of determining motion response values, as executed at step 450, will be described in detail below with reference to FIG. 5.

The method 400 continues at combining step 460, where the motion response values determined at step 450 are combined, under execution of the processor 105, in order to determine spatio-temporal feature values. For each spatial region there is a motion response value for each combination of spatial feature function and velocity. At step 460, the motion response values are combined such that, for each spatial region, there is a resultant spatio-temporal feature value for each velocity. The spatio-temporal feature value is informative with regard to the likelihood that an object at the spatial region has moved with the velocity.

Thus, the determination of spatio-temporal features at a spatial region combines the information determined from multiple aspects of the visual appearance of an object at the spatial region, in order to determine a set of likelihoods that are informative with regard to the movement of the object.

The combination of motion response values at step 460 is such that a uniformly high set of values determines a correspondingly high spatio-temporal feature value. However, a small number of high motion response values determines a lower spatio-temporal feature value. The combination of motion response values is such that a uniform increase in the motion response values determines a corresponding increase in the spatio-temporal feature value. The motion response values may be combined by summation, in order to determine a spatio-temporal feature value. Alternatively, the motion response values may be combined by determination of an arithmetic mean, being the sum divided by the number of motion response values.

The method 500 of determining motion response values, as executed at step 450, will now be described with reference to FIG. 5. The method 500 may be implemented as one or more software code modules of the software application program 133 resident on the hard disk drive 110 and being controlled in its execution by the processor 105.

A motion response value is informative with regard to the correlation between a vanishing response value determined at a first spatial region, and the corresponding emergence response value determined at a second spatial region. The first and second spatial regions are spatially displaced, and the displacement is informative of the direction and speed of the apparent velocity of an object moving from the first region to the second region.

As input, the method 500 takes smoothed temporal gradient response values, being smoothed vanishing response values, and smoothed emergence response values. For each spatial region, there are a plurality of smoothed temporal gradient response values, corresponding to a plurality of underlying spatial feature functions using different combinations of orientation and scale, in order to be informative with regard to a plurality of edge orientations, texture orientations, and texture scales. In addition, for each temporal gradient response value at each spatial region, there may be a plurality of smoothed values, using different parameters of smoothing (e.g., different kernel sizes) corresponding to the different speeds.

As output, the method 500 determines, for each underlying spatial feature function at each spatial region, and for each velocity, a motion response value, being a likelihood that an object at that spatial region has moved with that velocity, based on a visual appearance detectable by that spatial feature function.

If an object is at a first spatial region, some spatial feature values are large, corresponding to the visual appearance of the object. If the object moves to a second spatial region, some spatial feature values at the first spatial region decrease, due to the disappearance of the object and the revelation of background at the first spatial region. Simultaneously, some spatial features at the second spatial region increase, due to the apparition of the object and the obscuration of background at the second spatial region. Thus, at the first spatial region, some vanishing response values are large. At the second spatial region, some corresponding emergence response values are large. The combination of a large vanishing response at a first spatial region and a large corresponding emergence response at a second spatial region is informative with regard to the possibility that an object has moved from the first spatial region to the second spatial region. The displacement between the first spatial region and the second spatial region is informative with regard to the direction and speed of movement of the object.

Given a set of spatial feature values, and a set of velocities, movement of an object causes a range of ambiguous responses, leading to multiple values of apparent movement. The range of ambiguous responses is due to the complex visual appearance of real objects. For example, visual appearance of an object may include multiple edges and textures that are present in multiple spatial regions, such that displacement of the object leads to ambiguity about which part of the object has moved to which location.

In order to reduce the ambiguity about which part of the object has moved to which location, the likelihoods from the set of spatial feature values may be combined. The likelihoods from the set of spatial feature values are combined in order to determine a single likelihood that an object at a first spatial region has moved to a second spatial region. Thus, each first spatial region has a set of likelihood values, corresponding to a set of second spatial regions, where each likelihood value represents the likelihood that an object at the first spatial region has moved to the second spatial region.

The set of likelihood values represents ambiguity regarding the true movement of the object. The ambiguity regarding the true movement of the object arises from the visual appearance of the object. Attempting to resolve the true movement ambiguity by choosing a single largest likelihood, as may be performed in optical flow feature functions in order to produce a single estimate of movement at each spatial region, introduces errors which contribute to errors in the detection of objects and actions in the video. The retention of such a multi-valued representation of movement is advantageous, because it provides more information about the visual appearance of objects, and increases the accuracy of the detection of objects and actions in video.

The method 500 starts at applying step 510 to apply velocity offsets to smoothed emergence response values. A plurality of velocities are considered, where each velocity is determined by a direction and a speed. The speed is determined to be the magnitude of the spatial displacement, divided by the time interval separating the first frame and the second frame. Each velocity is characterised by a spatial displacement between the first frame and the second frame, which may be expressed as a velocity offset, composed of a horizontal offset and a vertical offset.

In step 510, for each velocity, the spatial co-ordinates of the smoothed emergence response values are adjusted according to the velocity offset. Adjusting the spatial co-ordinates allows comparison of a smoothed vanishing response value with a displaced smoothed emergence response value, where the displacement corresponds to the velocity.

In the case that, for each temporal gradient response value at each spatial region, there is a plurality of smoothed values using different parameters of smoothing corresponding to the different speeds (e.g., different kernel sizes), the smoothed temporal gradient response value is chosen according to the velocity.

The method 500 continues at combining step 520 to combine, for each velocity, a smoothed vanishing response value and a smoothed emergence response value, where the smoothed emergence response value has been displaced according to the velocity by adjustment of the spatial co-ordinates, in order to determine a motion response value.

The vanishing response value and the emergence response value are combined at step 520 such that if either or both values are small, the resultant motion response value is also small. Both the vanishing response value and the emergence response value contribute to the motion response value, in such a way that an increase in either the vanishing response value, or an increase in the emergence response value, or an increase in both, results in an increase in the motion response value.

The vanishing response value and the emergence response value may be combined by multiplication, in order to determine the motion response value. Alternatively, the vanishing response value and the emergence response value may be combined by geometric mean, being the square root of the product. Alternatively, the vanishing response value and the emergence response value may be combined by harmonic mean, being twice the product divided by the sum.

An example of automated classification of video using the methods described above will now be described. The example identifies player actions, such as running, kicking, and dribbling, in videos of futsal.

In the futsal example, multiple fixed cameras are used to record games of futsal. Axis-aligned minimum bounding boxes may be determined using an automated human detection algorithm. An automated tracking algorithm is used to associate bounding boxes to humans in successive frames. A video for each detected human is determined by clipping regions from the original video. Thus, the video has apparent background motion, due to the change of location of the bounding box. The locations of the bounding boxes may be recorded, for subsequent use in global motion compensation.

For each pair of frames, location information from the position of the bounding box of the second frame relative to the position of the bounding box of the first frame, may be used to apply global motion compensation to the second frame. A collection of videos determined by clipping regions may be used in the training phase of the classifier (e.g., 240), and a collection of different videos determined by clipping regions may be used in the recall phase of the classifier. Ground-truth labels are assigned to the videos, and may be used to configure the parameters of the classifier in the training phase. The ground-truth labels may also be used to evaluate the accuracy of the classifier in the recall phase.

An artificial neural network may be used as the classifier (e.g., 240). The artificial neural network uses a combination of convolutional layers, recurrent layers, fully connected layers, and pooling steps.

Figure 7A:
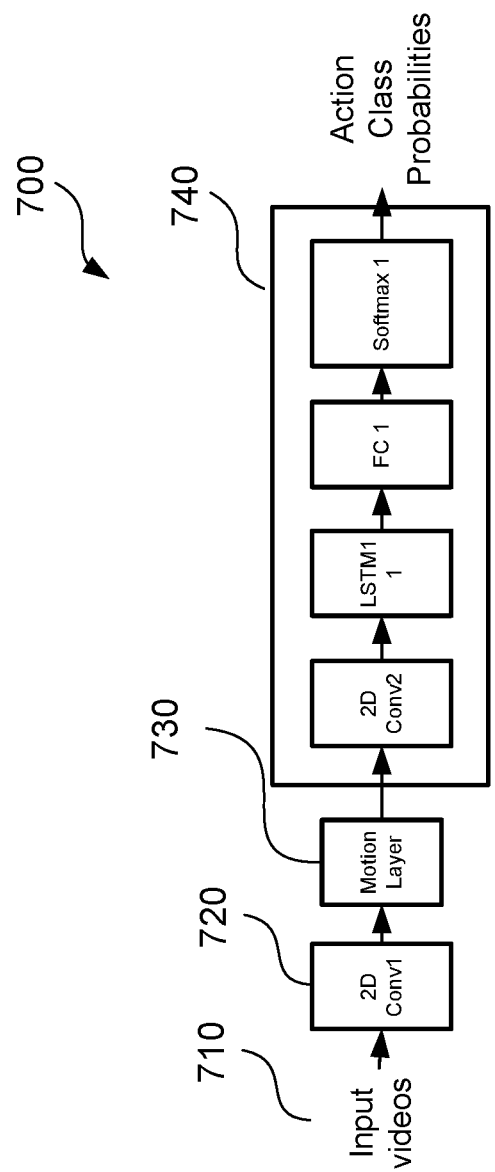
FIG. 7A shows an example of a neural network that may be used in one arrangement of the method of FIG. 3.

FIG. 7A shows an example of a neural network system 700 that may be used in one arrangement of the described methods. In FIG. 7A, input videos 710 comprise the videos for the training phase as described above. The input videos 710 also comprise the videos for the recall phase as described above. Two dimensional (2D) convolution layer 720 corresponds with step 310 described above where spatial feature values are determined at a plurality of locations of each frame of the input videos 710. Motion layer 730 corresponds with step 320 described above where spatio-temporal feature values are determined. Subsequent layers 740 correspond with the classifier 240.

Figure 7B:
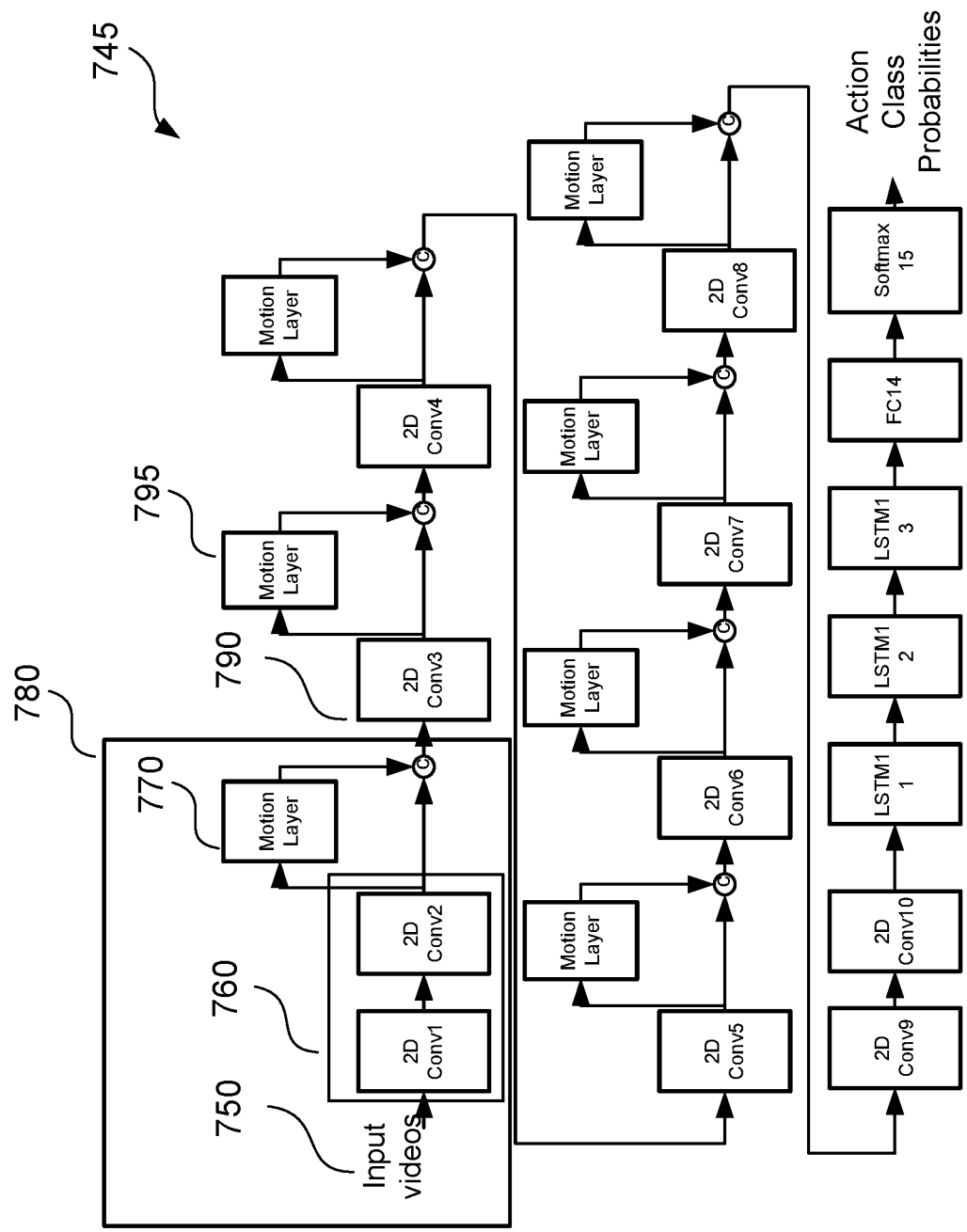
FIG. 7B shows an example of a neural network that may be used in an alternative arrangement of the method of FIG. 3.

FIG. 7B shows an example of a neural network 745 that may be used in another arrangement of the described methods. In FIG. 7B, input videos 750 comprise the videos for the training phase and the videos for the recall phase. The neural network 745 also comprises a series of 2D convolution layers 760 that correspond with step 310 described above with reference to FIG. 3 where spatial feature values are determined at a plurality of locations of each frame of the input videos 750. Motion layer 770 corresponds with step 320 described above with reference to FIG. 3, where spatio-temporal feature values are determined. All subsequent layers correspond with the classifier 240. Repeat application of the described methods may be implemented in the network 745 of FIG. 7B.

In an alternative arrangement of the described methods, the series of layers 780 corresponds with the videos 210, 250, as the output of the layers 780 consists of response values over two (2) spatial and one (1) temporal dimension, similar to video. The 2D convolution layer 790 in such an alternative arrangement corresponds with step 310 described above with reference to FIG. 3, and motion layer 795 corresponds with step 320 as described above with reference to FIG. 3. Subsequent convolution layers, motion layers and other layers provide repeat implementations of the described methods in a similar manner.

The videos may be converted into L*a*b* color space. Converting the videos into L*a*b* color space has the advantage of a separate channel for luminance (L*). Spatial feature values are determined for all three color channels. The use of a chroma/luma color space such as L*a*b* has the advantage that spatio-temporal feature values may be determined only for the luminance channel. Determining spatio-temporal feature values only for the luminance channel has the advantage of a reduction of the required computer execution time and computer memory, while still maintaining acceptable accuracy of the classifier.

A collection of one-dimensional symmetric sinusoidal filters may be used to determine spatial feature values for all three color channels separately. Each filter represents one period of a sine wave, with the maximum filter coefficient at the center of the filter. Filter coefficients may be normalized to unity sum of squares. Six filter lengths may be used: three (3), nine (9), fifteen (15), twenty-one (21), twenty-seven (27), and thirty-three (33) pixels. An excessively small number of filter lengths reduces the accuracy of the classifier (e.g., 240), because the resultant spatial features are less informative with regard to the visual appearance of objects. An excessively large number of filter lengths increases the computer execution time and usage of computer memory. Six filter lengths may be used as a compromise between an excessively small number of filter lengths and an excessively large number of filter lengths.

The filter lengths may range, for example, from three (3) to thirty three (33) pixels. The filter lengths are selected as a uniformly spaced samples from a range of values from a smallest expected size (e.g., three (3) pixels) of a characteristic of the visual appearance of an object, to a largest expected size (three-three (33) pixels) of a characteristic of the visual appearance of an object.

Each filter may be applied in four orientations: vertical, horizontal, and two diagonals. Each filter may be applied in two inversions: inverted, and not inverted. Such a combination of orientations and inversions gives a total of eight one-dimensional symmetric sinusoidal filters. The orientations of the eight filters correspond to the horizontal and vertical directions, and the forty-five (45) degree diagonal directions. An excessively small number of filters reduces the accuracy of the classifier (e.g., 240), because the resultant spatial features are less informative with regard to the visual appearance of objects. An excessively large number of filters increases the computer execution time and usage of computer memory. In one arrangement, eight filters may be selected as a compromise between an excessively small number of filters and an excessively large number of filters. The four orientations are selected as uniformly spaced angles around a circle.

Thus, in one arrangement, for each color channel, a total of forty-eight (48) spatial feature values may be determined at each location of each frame in the video, being the combination of four filter orientations, two inversions, and six filter lengths.

Spatial feature values from the luminance color channel may be used to determine spatio-temporal feature values. The spatio-temporal feature values may be used to determine the movement of objects in the video. For this purpose, luminance spatial feature values are sufficiently representative. The determination of spatio-temporal features from color channels a* and b* does not significantly improve the accuracy of the classifier (e.g., 240), and has the disadvantage of requiring more computer execution time and computer memory.

In order to determine the spatio-temporal feature values, each vanishing response may be determined by subtracting the luminance spatial feature value from the second frame (i.e., after global motion compensation) from the corresponding luminance spatial feature value from the first frame, and then determining the absolute value of the minimum of the result and zero, giving a non-negative value. In one arrangement, there may be forty-eight (48) vanishing response values for each pixel, corresponding to the forty-eight (48) luminance spatial feature values.

Each emergence response may be determined by subtracting the luminance spatial feature value from the first frame from the corresponding luminance spatial feature value from the second frame (i.e., after global motion compensation), and then determining the maximum of the result and zero, giving a non-negative value. In one arrangement, there may be forty-eight (48) emergence response values for each pixel, corresponding to the forty-eight (48) luminance spatial feature values.

Velocities may be determined, for example, using combinations of six speeds and eight directions, yielding a total of forty-eight (48) velocities. The six speed values may be: one (1), four (4), seven (7), ten (10), thirteen (13), and sixteen (16), where the units are the number of pixels displaced in the time period between the two frames. The eight directions may be: zero (0), forty-five (45), ninety (90), one-hundred and thirty-five (135), one-hundred and eighty (180), two-hundred and twenty-five (225), two-hundred and seventy (270), three-hundred and fifteen (315) degrees, being the horizontal and vertical directions, and the forty-five (45) degree diagonal directions.

An excessively small number of speed values reduces the accuracy of the classifier (e.g., 240), because the resultant spatio-temporal features are less informative with regard to the movement of objects. An excessively large number of speed values increases the computer execution time and usage of computer memory. Six speed values may be chosen as a compromise between an excessively small number of speed values and an excessively large number of speed values.

In one arrangement, the speed values, ranging from one (1) to sixteen (16) pixels per frame interval, may be selected as a uniformly spaced samples from a range of values from a lowest possible speed (e.g., one (1) pixel), to a highest expected speed (e.g., sixteen (16) pixels per frame interval) of the movement of an object.

An excessively small number of directions reduces the accuracy of the classifier (e.g., 240), because the resultant spatio-temporal features are less informative with regard to the movement of objects. An excessively large number of directions increases the computer execution time and usage of computer memory. In one arrangement, eight directions may be selected as a compromise between an excessively small number of directions and an excessively large number of directions. The eight directions may be selected as uniformly spaced angles around a circle.

For each of the six speed values, a corresponding two-dimensional Gaussian function may be applied in order to smooth the vanishing response values and emergence response values determined at step 450. In order to reduce the computer execution time, in one arrangement, six square kernels may be determined, and then applied repeatedly to the vanishing response values and emergence response values. The standard deviation of the Gaussian function that may be used to determine each kernel is proportional to the speed. Each Gaussian function is centered in the kernel. Larger kernels may be used for larger speed values. The kernels are shown in Table 1, below:

TABLE 1

| Speed | Kernel size | Gaussian standard deviation |
|---|---|---|
| 1 | 3 × 3 | 0.383 |
| 4 | 7 × 7 | 1.531 |
| 7 | 11 × 11 | 2.679 |
| 10 | 15 × 15 | 3.827 |
| 13 | 19 × 19 | 4.975 |
| 16 | 23 × 23 | 6.123 |

The kernel coefficients are normalised to unity sum of squares.

Application of the six kernels shown in Table 1 to the forty-eight (48) vanishing response values per pixel yields two-hundred and eighty-eight (288) smoothed vanishing response values per pixel. Similarly, there are two-hundred and eighty-eight (288) smoothed emergence response values per pixel.

Each velocity may be characterised by a spatial displacement between the first frame and the second frame, which may be expressed as a velocity offset, composed of a horizontal offset and a vertical offset.

The spatial co-ordinates of the smoothed emergence response values may be adjusted according to the velocity offset. Adjusting the smoothed emergence response values according to the velocity offset allows comparison of a smoothed vanishing response value with a displaced smoothed emergence response value, where the displacement corresponds to the velocity.

For each of the forty-eight (48) velocities, the horizontal offset is determined in accordance with Equation (3) as follows:

$$\text{offset}\_h = \text{speed} * \cos(\text{direction}) \quad (3)$$

For each velocity, the vertical offset is determined in accordance with Equation (4), as follows:

$$\text{offset}\_v = \text{speed} * \sin(\text{direction}) \quad (4)$$

For each velocity, the corresponding smoothed emergence response values (i.e., using the smoothing kernel corresponding to the speed) may be offset using the horizontal offset and vertical offset, in order to spatially align the smoothed emergence response values with the smoothed vanishing response values.

Figure 6:
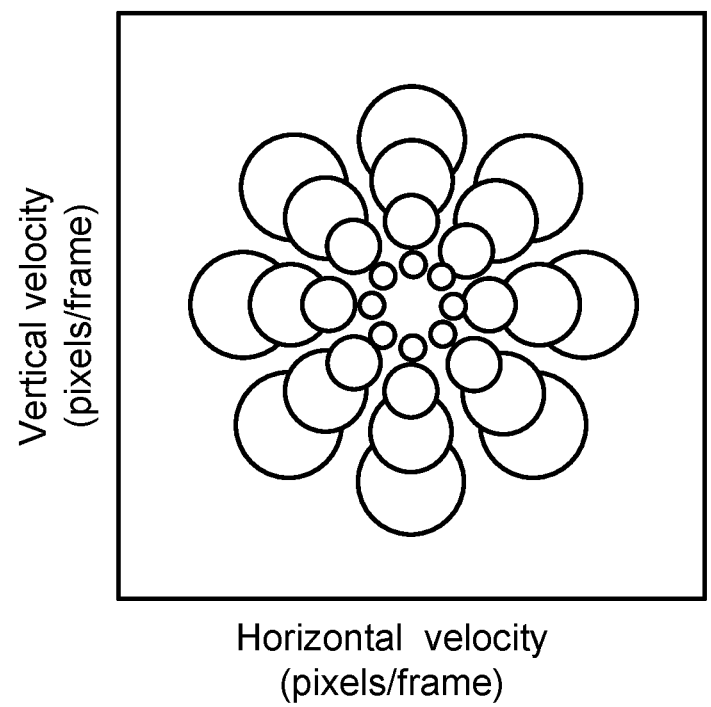
FIG. 6 shows a contour plot of the response values of motion velocity components, representing the receptive field size of each motion component.

A representation of the smoothed emergence response values is shown in FIG. 6. In FIG. 6, response values of each velocity component are represented as a contour plot of the approximately half response values, according to the horizontal and vertical velocity. The contours shown in FIG. 6 correspond with the values shown in Table 1. The response values correspond with the receptive field of each motion component.

In order to determine spatio-temporal feature values, motion response values are first determined. For each velocity, the smoothed vanishing response value is combined with the smoothed emergence response value (i.e., offset according to the speed and direction), for example, by determining the geometric mean of the two values, in order to determine the motion response value. A motion response value may also be determined using the product of the two values, or using a weighted linear combination of the two values, or other operations to combine the two values.

Figure 8:
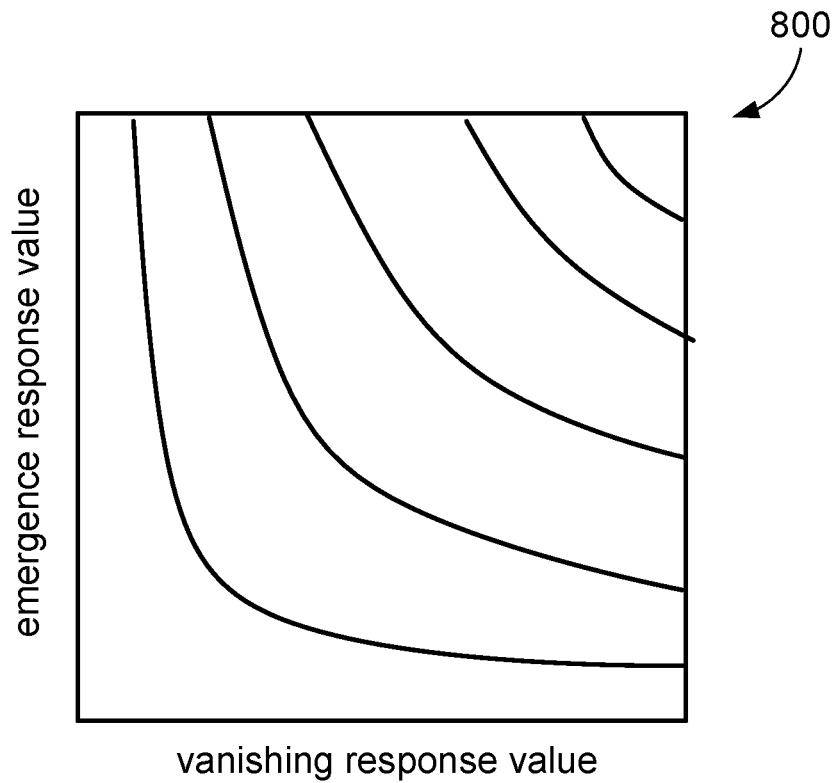
FIG. 8 shows a contour plot of a response profile where geometric mean is used for combining values.

The use of geometric mean to determine the motion response value scales linearly with the scale of the two values, and approaches zero as either of the two values approaches zero. Such a response profile 800 is shown as a contour plot in FIG. 8.

In one arrangement, for each pixel, a motion response value may be determined for each of the forty-eight (48) luminance spatial feature values and for each of the forty-eight (48) velocities, giving a total of two-thousand-three hundred and four (2304) motion response values per pixel.

In one arrangement, for each pixel, the arithmetic mean of the motion response values corresponding to the forty-eight (48) luminance spatial feature values may be determined, giving forty-eight (48) spatio-temporal feature values per pixel. Each spatio-temporal feature value corresponds to a velocity, determined at that pixel location.

In order to automatically analyse a video in order to obtain metadata, the video may be divided into temporal segments of uniform length of twenty-five (25) frames. For each temporal segment, twenty-four (24) pairs of consecutive frames are determined. For each pixel in each pair of consecutive frames, a feature vector may be determined. For each pair of consecutive frames, a feature vector may be determined by concatenation of the feature vectors of the pixels. For each temporal segment, a feature vector may be determined by concatenation of the feature vectors of the twenty-four (24) pairs of frames, and may be used to train the classifier (e.g., 240) in the training phase, or to obtain metadata from the classifier in the recall phase.

For each pixel in each pair of consecutive frames, the feature vector may be determined by a concatenation of forty-eight (48) spatial feature values from the L* (luminance) channel of the first frame, forty-eight (48) spatial feature values from the a* color channel of the first frame, forty-eight (48) spatial feature values from the b* color channel of the first frame, and forty-eight (48) spatio-temporal feature values. Thus, in one arrangement, a feature vector of length one-hundred and ninety-two (192) values may be determined for each pixel in each pair of consecutive frames.

In the training phase, the classifier (e.g., 240) may be trained using feature vectors for temporal segments. The feature vectors may include spatio-temporal features determined according to the method 400.

In the recall phase, the classifier (e.g., 240) may be used to identify actions using feature vectors for temporal segments. The feature vectors may include spatio-temporal features determined according to the method 400. The classifier shows an increase in accuracy compared to classifiers using feature vectors that do not include the spatio-temporal features according to the method 400.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining a spatio-temporal feature value for frames of a sequence of video using a neural network that has a motion layer for determining the spatio-temporal feature value as an intermediate layer, the method comprising:
   receiving a first frame and second frame from the sequence of video;
   determining spatial feature values in each of the first and second frames using a layer upstream of the motion layer of the neural network;
   determining at least one emergence response value indicating emergence of the spatial feature values between the first and second frames and at least one vanishing response value indicating vanishing of the spatial feature values between the first and second frames using the motion layer;
   combining the emergence response value and the vanishing response value using the motion layer;
   determining a change in the spatial feature values between the first and second frames based on the combined emergence response value and vanishing response value using the motion layer;
   determining the spatio-temporal feature value by combining the determined change in the spatial feature values using the motion layer; and
   performing classification regarding an object included in the sequence of video, based on the spatio-temporal feature value, using a layer downstream of the motion layer of the neural network.

2. The method according to claim 1, wherein the change in the spatial feature values is determined based on background motion between the first and second frames.

3. The method according to claim 1, further comprising determining at least one emergence response value for determining the change in the spatial feature values.

4. The method according to claim 3, further comprising smoothing the emergence response value.

5. The method according to claim 1, further comprising determining at least one vanishing response value for determining the change in the spatial feature values.

6. The method according to claim 5, further comprising smoothing the vanishing response value.

7. The method according to claim 1, wherein the emergence response value and the vanishing response value are combined using a geometric mean.

8. The method according to claim 1, wherein a spatio-temporal feature value is determined for each of a plurality of directions.

9. The method according to claim 1, wherein the spatio-temporal feature value is determined by combining motion response values.

10. The method according to claim 1, wherein the vanishing response corresponds to a decrease of the spatial feature values over the time period between the first and second frames and the emergence response corresponds to an increase of the spatial feature values over the time period between the two first and second frames.

11. An apparatus for determining a spatio-temporal feature value for frames of a sequence of video using a neural network that has a motion layer for determining the spatio-temporal feature value as an intermediate layer, the apparatus comprising:
    at least one processor; and
    a memory that is in communication with the at least one processor and stores one or more computer-readable instructions, wherein the computer-readable instructions cause, when executed by the at least one processor, the at least one processor to operate to:
    receive a first frame and second frame from the sequence of video;
    determine spatial feature values in each of the first and second frames using a layer upstream of the motion layer of the neural network;
    determine at least one emergence response value indicating emergence of the spatial feature values between the first and second frames and at least one vanishing response value indicating vanishing of the spatial feature values between the first and second frames using the motion layer;
    combine the emergence response value and the vanishing response value using the motion layer;
    determine a change in the spatial feature values between the first and second frames based on the combined emergence response value and vanishing response value using the motion layer;
    determine the spatio-temporal feature value by combining the determined change in spatial feature values for each of the spatial feature functions; and
    perform classification regarding an object included in the sequence of video, based on the spatio-temporal feature value, using a layer downstream of the motion layer of the neural network.

12. A system for determining a spatio-temporal feature value for frames of a sequence of video using a neural network that has a motion layer for determining the spatio-temporal feature value as an intermediate layer, the system comprising:
    a memory for storing data and a computer program;
    a processor coupled to the memory for executing the computer program, the program having instructions for:
    receiving a first frame and second frame from the sequence of video;
    determining spatial feature values in each of the first and second frames using a layer upstream of the motion layer of the neural network;
    determining at least one emergence response value indicating emergence of the spatial feature values between the first and second frames and at least one vanishing response value indicating vanishing of the spatial feature values between the first and second frames using the motion layer;
    combining the emergence response value and the vanishing response value using the motion layer;

determining a change in the spatial feature values between the first and second frames based on the combined emergence response value and vanishing response value using the motion layer;

determining the spatio-temporal feature value by combining the determined change in spatial feature values using the motion layer; and performing classification regarding an object included in the sequence of video, based on the spatio-temporal feature value, using a layer downstream of the motion layer of the neural network.

13. A non-transitory computer readable medium having a computer program for determining a spatio-temporal feature value for frames of a sequence of video using a neural network that has a motion layer for determining the spatio-temporal feature value as an intermediate layer, the program comprising:

code for receiving a first frame and second frame from the sequence of video;

code for determining spatial feature values in each of the first and second frames using a layer upstream of the motion layer of the neural network;

code for determining at least one emergence response value indicating emergence of the spatial feature values between the first and second frames and at least one vanishing response value indicating vanishing of the spatial feature values between the first and second frames using the motion layer;

code for combining the emergence response value and the vanishing response value using the motion layer;

code for determining a change in the spatial feature values between the first and second frames based on the combined emergence response value and vanishing response value using the motion layer;

code for determining the spatio-temporal feature value by combining the determined change in spatial feature values for each of the spatial feature functions; and code for performing classification regarding an object included in the sequence of video, based on the spatio-temporal feature value, using a layer downstream of the motion layer of the neural network.

* * * * *